(12) United States Patent
Dong

(10) Patent No.: US 11,186,498 B2
(45) Date of Patent: Nov. 30, 2021

(54) FILTRATION MEDIUM FOR REMOVAL OR INACTIVATION OF MICROORGANISMS FROM WATER

(71) Applicant: MESOFILTER INC., San Jose, CA (US)

(72) Inventor: Liangjie Dong, Honolulu, HI (US)

(73) Assignee: MESOFILTER INC., San Jose, CA (US)

( * ) Notice: Subject to any disclaimer, the term of this patent is extended or adjusted under 35 U.S.C. 154(b) by 0 days.

(21) Appl. No.: 16/362,679

(22) Filed: Mar. 24, 2019

(65) Prior Publication Data
US 2019/0218111 A1    Jul. 18, 2019

Related U.S. Application Data

(63) Continuation of application No. PCT/US2017/053452, filed on Sep. 26, 2017, which
(Continued)

(51) Int. Cl.
*C02F 1/28* (2006.01)
*B01D 29/07* (2006.01)
(Continued)

(52) U.S. Cl.
CPC .......... *C02F 1/281* (2013.01); *B01D 29/0027* (2013.01); *B01D 29/07* (2013.01);
(Continued)

(58) Field of Classification Search
CPC ........ B01D 15/00; B01D 15/02; B01D 15/08; B01D 15/26; B01D 24/00; B01D 27/00; B01D 27/005; B01D 27/02; B01D 27/08; B01D 29/00; B01D 29/0093; B01D 29/01; B01D 29/11; B01D 39/00; B01D 39/02; B01D 39/06; B01D 39/08; B01D 39/083; B01D 2101/00; B01D 2101/04; B01D 2215/00; B01D 2221/00; B01D 2221/04;
(Continued)

(56) References Cited

U.S. PATENT DOCUMENTS 3,573,158 A * 3/1971 Pall .................. B01D 29/21
                                                    162/131
4,231,768 A * 11/1980 Seibert .................. A61L 9/00
                                                    210/DIG. 5
(Continued)

FOREIGN PATENT DOCUMENTS

| CN | 104291797 A | 1/2015 | |
| CN | 103386231 B | 2/2015 | |
| EP | 0393723 A2 * | 10/1990 | .......... B01J 20/3208 |

OTHER PUBLICATIONS

Search Report and Written Opinion in PCT/US17/53452.
(Continued)

*Primary Examiner* — Joseph W Drodge
(74) *Attorney, Agent, or Firm* — Yong Chen

(57) ABSTRACT

A filtration medium useful to remove bacteria and/or inactivate virus in water. Examples of the medium include two outer layers made from cellulose fibers and an inner layer made of packed ceramic granules. Methods for producing the medium are also provided.

7 Claims, 4 Drawing Sheets

Related U.S. Application Data is a continuation-in-part of application No. PCT/US2017/036922, filed on Jun. 11, 2017.

(60) Provisional application No. 62/399,485, filed on Sep. 26, 2016.

(51) Int. Cl.

| | | |
|---|---|---|
| *B01D 69/12* | (2006.01) | |
| *B01D 69/14* | (2006.01) | |
| *B32B 5/26* | (2006.01) | |
| *B01D 71/10* | (2006.01) | |
| *B01D 71/02* | (2006.01) | |
| *B01D 29/00* | (2006.01) | |
| *B01D 39/04* | (2006.01) | |
| *B01J 20/08* | (2006.01) | |
| *B01D 61/14* | (2006.01) | |

(52) U.S. Cl.
CPC ............ *B01D 39/04* (2013.01); *B01D 61/147* (2013.01); *B01D 69/12* (2013.01); *B01D 69/141* (2013.01); *B01J 20/08* (2013.01); *B32B 5/26* (2013.01); *B01D 71/024* (2013.01); *B01D 71/10* (2013.01)

(58) Field of Classification Search
CPC ............ B01D 2221/06; B01D 2221/12; B01D 2221/14; B01D 2239/00; B01D 2239/02; B01D 2239/04; B01D 2239/0407; B01D 2239/0442; B01D 2239/0471; B01D 2239/06; B01D 2239/0485; B01D 2239/0645; B01D 2257/00; B01D 2257/93; B01D 29/07; B01D 69/141; B01D 69/12; B01D 61/147; B01D 71/10; B01D 71/024; B01D 2221/02; B01D 2221/0407; B01D 2221/0442; B01D 2221/0471; B01D 2221/0485; B01D 2221/0486; B01D 39/04; B01D 39/20; B01D 39/2027; B01D 29/0018; B01D 29/0027; B01D 29/0095; C02F 1/00; C02F 1/001; C02F 1/50; C02F 1/58; C02F 1/62; C02F 1/705; C02F 2101/00; C02F 2101/10; C02F 2103/00; C02F 2103/06; C02F 2103/10; C02F 2103/30; C02F 2103/34; C02F 2303/00; C02F 1/281; C02F 1/288; C02F 2101/103; B32B 5/26; B32B 2264/107; B32B 2307/732; B32B 2307/72; B32B 2262/0276; B32B 2262/0261; B32B 2262/0246; B32B 2262/101; B32B 2250/03; B32B 2250/40; B32B 2262/062; B32B 2262/0253; B32B 5/16; B32B 7/04; B32B 5/30; B32B 5/022; B32B 5/22; B01J 20/08; B01J 20/28026; B01J 20/28078; B01J 20/28083; B01J 20/28085; C01B 39/02; C01B 39/06

USPC ....... 210/660, 681, 683, 688, 767, 777, 263, 210/282, 348, 483, 496, 499, 500.1, 210/500.21, 502.1

See application file for complete search history.

(56) References Cited

U.S. PATENT DOCUMENTS

| | | | | |
|---|---|---|---|---|
| 4,652,376 | A | * | 3/1987 | Kumaoka .......... B01D 17/0202 210/694 |
| 5,911,883 | A | * | 6/1999 | Anderson ............. B01D 15/08 210/502.1 |
| 8,361,920 | B2 | | 1/2013 | Dong |
| 8,607,992 | B2 | | 12/2013 | Farrelly |
| 9,988,285 | B2 | * | 6/2018 | Dong ................... B01J 20/3204 |
| 10,239,042 | B2 | * | 3/2019 | Dong ....................... B01J 20/12 |
| 2003/0178357 | A1 | | 9/2003 | Wolff et al. |
| 2006/0049091 | A1 | | 3/2006 | Cheetham |
| 2008/0227628 | A1 | * | 9/2008 | Le Van Mao .......... B01J 29/087 502/62 |
| 2008/0311288 | A1 | * | 12/2008 | Dong ..................... C02F 1/281 427/190 |
| 2011/0000854 | A1 | * | 1/2011 | Nichols .................... B01J 20/26 210/666 |
| 2011/0139726 | A1 | * | 6/2011 | Jin .......................... B82Y 30/00 210/748.08 |
| 2012/0031833 | A1 | * | 2/2012 | Ho ..................... B01D 67/0072 210/488 |
| 2012/0152843 | A1 | | 6/2012 | McEvoy |
| 2013/0175222 | A1 | * | 7/2013 | Spittle ..................... C02F 1/004 210/683 |
| 2013/0331247 | A1 | | 12/2013 | Yang et al. |
| 2014/0079621 | A1 | | 3/2014 | Armijo |
| 2014/0338296 | A1 | | 11/2014 | Backhaus-Ricoult |
| 2015/0001155 | A1 | | 1/2015 | Johnson |
| 2015/0001156 | A1 | * | 1/2015 | Johnson .............. B01J 20/3225 210/688 |
| 2015/0001157 | A1 | * | 1/2015 | Johnson ................. C02F 1/288 210/688 |
| 2015/0375302 | A1 | | 12/2015 | Deb |
| 2016/0023922 | A1 | * | 1/2016 | Addiego ............ B01J 20/28045 210/688 |

OTHER PUBLICATIONS

Arvig, "Ceramic Water Filters: What to Know Before You Buy", Jan. 2, 2014.
Search Report and Written Opinion in PCT/US17/36922.

\* cited by examiner

FILTRATION MEDIUM FOR REMOVAL OR INACTIVATION OF MICROORGANISMS FROM WATER

CROSS REFERENCE TO RELATED APPLICATION

This application is a continuation of International application PCT/US2017/053452 filed on Sep. 26, 2017, which is a Continuation-in-Part of International application PCT/US2017/036922 filed on Jun. 11, 2017 and also claims the benefit of priority to U.S. Provisional Application No. 62/399,485 filed Sep. 26, 2016. The disclosure of each of these prior-filed applications is incorporated herein by reference in its entirety.

FIELD OF THE INVENTION

This invention relates to materials, compositions and methods for removing or inactivating microorganisms from a fluid or air, and more particularly, for removing bacteria and inactivating virus from water.

BACKGROUND

Bacteria are often found in water supply, and pathogenic bacteria may cause illnesses such as typhoid fever, gastroenteritis, infectious hepatitis, and cholera. Bacterial removal is an important aspect of urban water treatment process. Common methods for bacterial removal include microfiltration, ultrafiltration, reverse osmosis, ultraviolet sterilization, chemical oxidation and disinfection, among which chemical oxidation and disinfection is the most widely used, ozone oxidation and chlorine treatment being representative of such a process.

These available technologies of bacteria treatment suffer from various deficiencies. For example, filtration methods, including membrane filtration, reverse osmosis, and ultrafiltration, can be expensive, and requires high pressure to operate. Additionally, disposal of filtration media can be problematic.

Viruses can also be present in water sources. They are very species-specific, and human-specific viruses tend to be less present in settings where there is little human traffic. In developed regions of the world, viral outbreaks due to contamination of water supply are rare. However, in much of the developing world where sanitation is poor, uncontrolled sewage can contaminate drinking water, and viruses still pose a significant risk. Viral infections in these regions can be spread to other parts of the world by international travel.

Viruses are extremely small microorganisms. Most species fall within 0.01-0.3 microns in size. To remove viruses from sewage and water source in large scale, activated sludge, coagulation by metal ions or lime, or chemical disinfection are commonly used. However, it is difficult to remove viruses from water using any point of use rapid filtration devices.

There remains a need for new materials and methods for removal of microbes from water that are simple, cost-effective and with improved performance.

SUMMARY OF THE INVENTION

The purpose and advantages of the disclosed subject matter will be set forth in and apparent from the description that follows, as well as will be learned by practice of the disclosed subject matter. Additional advantages of the disclosed subject matter will be realized and attained by compositions and methods particularly pointed out in the written description and claims hereof, as well as from the appended drawings.

The present invention generally provides for a filtration medium, which includes a first layer of fibrous material, a second layer of fibrous material, and a third layer disposed between the first layer and the second layer. The third layer includes porous ceramic granules comprising pores of about 20 to about 140 nm in diameter.

In some embodiments, the granules comprise at least one metal. The metal can be zero valent iron. The zero valent iron can be deposited in the pores of the granules in-situ.

In some embodiments, at least one of the first layer and the second layer of fibrous material is made of cellulose fibers.

In some embodiments, the medium is sheet-like and has a total thickness of about 1 mm or less.

In some embodiments, the granules of the third layer have an outer diameter of not exceeding 50 microns.

In some embodiments, the medium has a basis weight of 100 to 200 gram/m$^2$ (gsm).

In some embodiments, the medium is effective for removal of bacteria in water.

In some embodiments, the medium is effective for inactivating viruses in water when virus-containing water is passed through the medium.

DETAILED DESCRIPTION

Embodiments of the invention are disclosed herein, in some cases in exemplary form or by reference to one or more Figures. However, any such disclosure of a particular embodiment is for illustration purpose only, and is not indicative of the full scope of the invention.

In one aspect of the present invention, a filtration medium is provided. In some embodiments, the filtration medium is effective to remove bacteria from water. In certain embodiments, the filtration medium is effective to inactivate or kill viruses. The medium can also remove metallic ions contaminants from water, e.g., arsenic (including arsenates, arsenites), and lead (Pb) ions. Thus, the filtration medium can treat water to remove many species of harmful substances all at once. Moreover, the filtration medium can perform all these functions by gravity filtration, i.e., the medium can be self-standing or placed on top of a container and water is passed through it from above and flows to the container thereunder. No vacuum pump or external pressure is required; water can pass through the layers just by gravity. Thus, the filter medium is particularly suitable for point of use devices for treating water of questionable quality.

Figure 1:
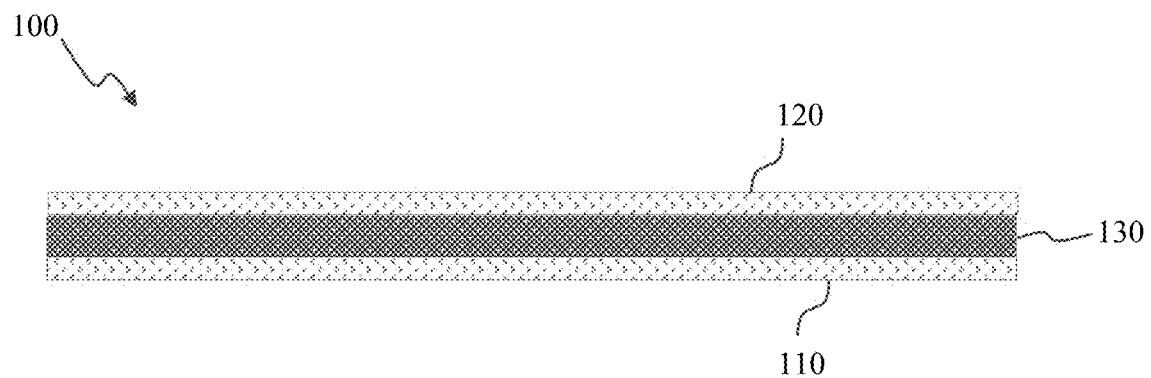
FIG. 1 depicts the layered structure of a filtration medium according to some embodiments of the present invention.

As illustrated in FIG. 1, filtration medium 100 includes a first layer 110 made from a fibrous material, a second layer 120 made from a fibrous material, and a third layer 130 disposed between the first layer 110 and the second layer 120. The third layer includes porous ceramic granules having pores of about 20 nm to about 140 nm in diameter. For convenience and illustration below, the first layer 110 is also referred to as the bottom layer, and the second layer 120 is also referred to as the top layer, and the third layer 130 is also referred to as the intermediate layer.

The bottom layer 110 and the top layer 120 can each be made from nonwoven fibers, such as natural cellulose fibers, which can be cotton fibers or fibers derived from other plants. Synthetic fibers can also be included, such as polyethylene, polypropylene, polyesters, polyamides, acrylics, fiber glass, etc. Manufacture of the filtration medium can be accomplished by a procedure similar to that for making nonwoven fabric. For example, cellulose fibers, e.g., in pulp form, can be laid on a surface, and then the ceramic granules are laid on top of the cellulose fibers with predetermined density ($g/m^2$, or gsm). Finally, another layer of cellulose fibers is laid on top of the ceramic granules. The layered structure is compacted while being subject heat treatment, e.g., by heated rollers, for the bonding of the fibers and the tight integration of the layers, as well as for removing moisture. The ceramic granules may partially aggregate during the process. The residual moisture can be further heated by microwave heater. The finished medium product is sheet-like, and can be flexible and foldable like regular paper. While generally porous (with pore sizes in tens or hundreds of microns), the top and bottom fiber layers provide strength and structural integrity for the medium. The medium can be made in varying thickness, e.g., about 2 mm or less, about 1 mm or less, or even thinner.

The ceramic granules for the intermediate layer include a plurality of pores having a diameter from 20 nm to 140 nm. In some embodiments, at least 50% of the pores of the medium have a diameter between about 20 nm and about 70 nm. In other embodiments, at least 60%, at least 65%, at least 70%, at least 75%, at least 80%, at least 85%, or at least 90% of the pores of the medium have a diameter between 20 nm to 70 nm. In some embodiments, at least 70% of the plurality of pores have a diameter between 40 nm and about 60 nm. The pores form open structure so that water can permeate through the medium. If the pores sizes are too large, microorganisms like bacteria and virus can pass freely through the pores without being trapped or otherwise impaired.

The ceramic granules can be based on aluminum oxide and contains about 90 wt % or more aluminum oxide, and may further include carbon. In some embodiments, the ceramic granules include zero valent iron (or ZVI or Fe(0)). In exemplary embodiments, the granules can be made according to the procedure described in U.S. provisional application 62/349,022 filed Jun. 12, 2016 as well as in PCT Application PCT/US2017/036922 filed on Jun. 11, 2017, the disclosure of which is incorporated herein by reference in its entirety. Briefly, a structuring material (such as a clay material containing 70 wt % or more of aluminum oxide, e.g., diatomaceous earth, which can be desiliciated first to reduce $SiO_2$ content) is mixed with a carbon source material (such as a carbohydrate, e.g., sugar or starch) and water to obtain a raw pottery or ceramic granule, which contains carbon (at least some of which is believed to be activated carbon) adhering to the walls of the pores comprising mostly aluminum oxide. The raw pottery or ceramic granule is then heated or fired in an anoxic atmosphere or chamber to produce a porous granule, which is then put into contact first with a solution containing $Fe^{2+}$ and then a reductant (such as $NaBH_4$ or $KBH_4$) that reduces $Fe^{2+}$ to ZVI in the pores of the porous granule in-situ. The ZVI containing porous granule is again heated in an anoxic atmosphere to produce the granules for use in the intermediate layer. Such ZVI containing granules are capable of removing arsenates, arsenites, Pb, Cd, Hg, and other heavy metal ions in water.

To reduce the chance of the microorganisms escaping through the interstices of the granules, the size of the ceramic granules should be sufficiently small to ensure close packing of the granules. For example, the granules can have an outer diameter of not exceeding about 50 microns (or the granules can be screened by size 320 mesh). In some embodiments, the packing density of the granules in terms of basis weight can be about 50 to about 300 gsm, or about 100 to about 200 gsm. The granules should be evenly distributed within the outer fibrous layers without crevices or holes when examined in spotlight devices.

The filtration medium of the present invention can be effective for removal of bacteria in water. As the size of the pores of the granules are generally smaller than the size of bacteria, bacteria in water will be intercepted by the filtration medium, usually at the interface between the granules and the fibrous layer.

Furthermore, the filtration medium of the present invention can be effective for inactivating or killing viruses in water when virus-containing water is passed through the filtration medium by gravity. While not wishing to be bound by any particular theory, it is believed that when a virus is small enough to get into the pores to the ceramic granules, when it migrates through the interconnected porous structure, its protective envelope or capsid (the protein shell) can be damaged by the jagged pore surface of the ceramic granules, which causes the genetic material of the virus to degrade or otherwise lose its activity.

The following examples are by way of illustration and not by way of limitation.

Example 1: Manufacture of Granules of the Intermediate Layer

Diatomaceous earth powders from bauxite mining site treated by desilicication were grinded into 1200 standard mesh by air blow selection and separation, and mixed with 5% of starch as carbon source. The mixture powder was granulated in size of 0.5 mm to 1.0 mm raw pottery by adding about 12% to about 15% pure water (on the basis of the weight of the raw pottery). The raw pottery granule thus formed was fired in 500° C. for three hours with a temperature increase rate of 2° C./min. The fired media was submerged in 2% $FeSO_4$ solution for 15 minutes, taken out to naturally leach out the water, and then put into 2% of $NaBH_4$ solution for 30 minutes for zero valent iron crystallization to occur inside the pores of the media. The ZVI solution treated media was fired again in an oven at 480-500° C. for 3 hours with protection of nitrogen during the entire firing process. The treated media was then cooled down to room temperature and stored for future use.

Example 2: *E. Coli* Capture

Figure 2A:
FIGS. 2A-2D are SEM micrographs of captured *E. coli* by a filtration medium according to some embodiments of the present invention.
Figure 2B:
Figure 2C:
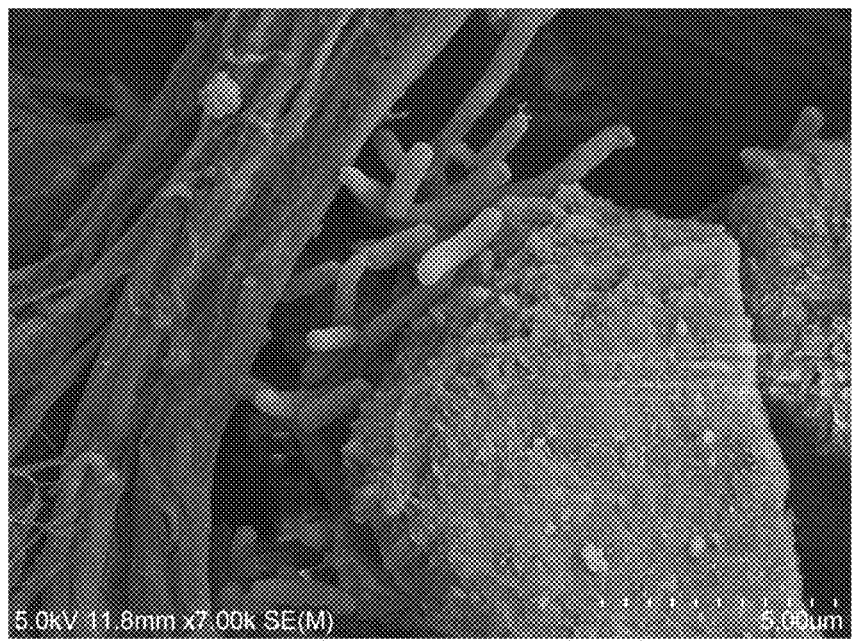
Figure 2D:
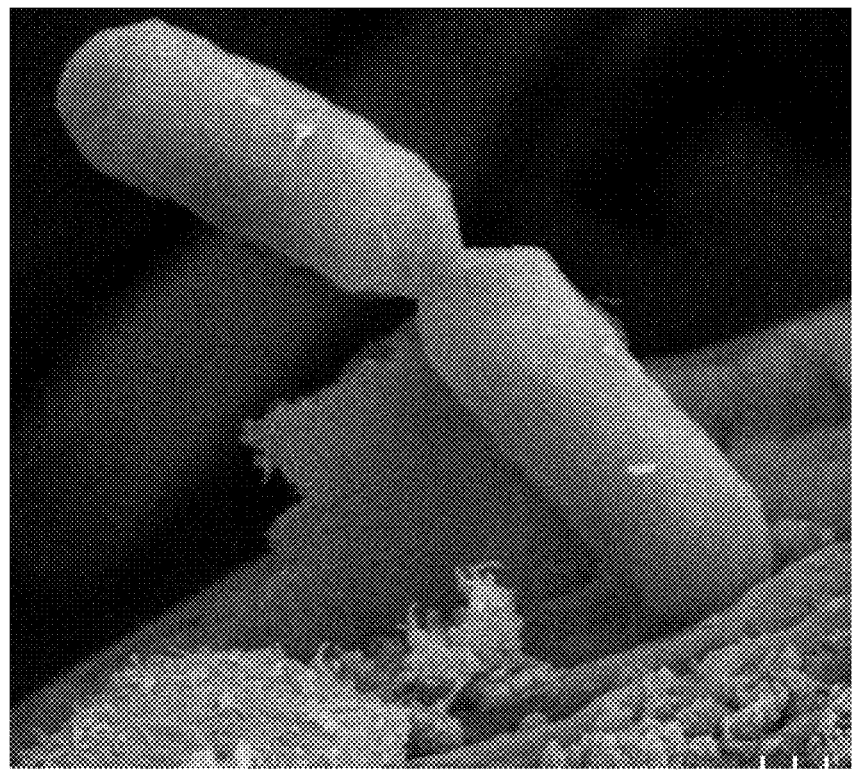

A sheet-like filtration medium of the present invention containing an intermediate layer including granules prepared in accordance with Example 1 is used to filter a solution containing *E. coli*. FIGS. 2A-2D includes certain SEM pictures of captured *E. coli* by the filtration medium. It is shown that the bacteria are generally retained on the edges of the ceramic granules, near the interface at the fibrous layer (FIG. 2D shows a dividing *E. coli* as being immobilized on ceramic granules). It is surmised that the absorptive properties of the ceramic granules play a role in retaining the bacteria on their surfaces.

Example 3: Removal of *Bacillus cereus*

50 µl *Bacillus cereus* solution having a concentration of 10,000/ml was added to 500 ml sterile distilled water to prepare a *Bacillus* stock solution. 20 ml of the stock solution was taken with a graduated cylinder, and filtered with one sheet of a filtration medium of the present invention. Another 20 ml of the stock solution was filtered with two sheets of the filtration medium. 400 µL of the unfiltered bacilli bacteria solution as well as 400 µL of the two filtered solutions were added and spread in separate sterile agar plates. The plates were incubated at 37° C. for 24 h. The number of colonies in each plate was visually observed. It was found that one sheet of filtration medium was already sufficiently effective to remove all *Bacillus cereus* from the stock solution. Two sheets of the filtration medium also removed 100% of the *bacillus* from the stock solution.

Example 4: Killing Virus by Filtration Medium

Figure 3:
FIG. 3 is an SEM micrograph of a tobacco mosaic virus having passed a filtration medium according to some embodiments of the present invention.

A solution containing tobacco mosaic virus was passed through a filtration medium of the present invention. The virus was determined inactivated. As seen in FIG. 3, which is a SEM picture of a tobacco mosaic virus having passed the medium. It appeared that the envelope of the virus was cut open along its length direction, which apparently led to the demise of the virus.

It will be apparent to one skilled in the art that varying modifications can be made to the invention disclosed herein without departing from the scope and spirit of the invention.

What is claimed is:

1. A filtration medium in the form of a flexible sheet, comprising:
    a first layer of fibrous material;
    a second layer of fibrous material; and
    a third layer disposed between the first layer and the second layer, the third layer comprising porous ceramic granules having pores of about 20 nm to about 140 nm in diameter, wherein at least 60% of the pores have a diameter between 20 nm and about 70 nm, and wherein the porous ceramic granules comprise zero valent iron deposited in the pores in-situ, and the porous ceramic granules comprise about 90 wt % or more aluminum oxide which is obtained from desilicication of a clay material.

2. The medium of claim 1, wherein at least one of the first layer and the second layer of fibrous material comprises cellulose fibers.

3. The medium of claim 1, wherein the medium has a total thickness of about 1 mm or less.

4. The medium of claim 1, wherein the granules of the third layer have an outer diameter of greater than zero and not exceeding 50 microns.

5. The medium of claim 1, wherein the porous ceramic granules of the third layer have a packing density of 100 to 200 gsm.

6. The medium of claim 1, wherein the medium is effective for removal of bacteria in water.

7. The medium of claim 1, wherein the medium is effective for inactivating viruses in water when virus-containing water is passed through the medium.

* * * * *